United States Patent
Harada et al.

[11] Patent Number: 5,906,556
[45] Date of Patent: May 25, 1999

[54] LINE PRESSURE CONTROL APPARATUS OF AUTOMATIC TRANSMISSION

[75] Inventors: Chiaki Harada; Hiromasa Sakai, both of Kanagawa; Kazuhiro Takatori, Yokohama, all of Japan

[73] Assignee: Nissan Motor Co., Ltd., Yokohama, Japan

[21] Appl. No.: 08/956,293

[22] Filed: Oct. 23, 1997

[30] Foreign Application Priority Data

Oct. 30, 1996 [JP] Japan .................................. 8-288460

[51] Int. Cl.⁶ ........................................ F16H 61/14
[52] U.S. Cl. ........................ 475/63; 475/118; 475/120; 477/158; 477/175
[58] Field of Search ........................ 477/156, 158, 477/169, 174, 175, 180; 475/61, 65, 118, 120, 62, 63

[56] References Cited

U.S. PATENT DOCUMENTS

| | | | |
|---|---|---|---|
| 4,431,096 | 2/1984 | Kobayashi et al. | 477/64 X |
| 4,651,593 | 3/1987 | Aoki et al. | 475/62 X |
| 4,981,053 | 1/1991 | Yamaguchi | 477/158 X |
| 5,093,789 | 3/1992 | Yoshimura et al. | 477/158 X |
| 5,191,815 | 3/1993 | Kouta | 475/116 |
| 5,311,795 | 5/1994 | Yoshimura et al. | 475/63 X |
| 5,339,935 | 8/1994 | Ishii et al. | 475/65 X |
| 5,527,233 | 6/1996 | Tabata et al. | 477/62 |
| 5,634,869 | 6/1997 | Mikami et al. | 475/120 X |
| 5,641,043 | 6/1997 | Niiyama | 475/65 X |
| 5,733,223 | 3/1998 | Matsubara et al. | 477/175 |

FOREIGN PATENT DOCUMENTS

2-309056  12/1990  Japan .

*Primary Examiner*—Dirk Wright
*Assistant Examiner*—Peter T. Kwon
*Attorney, Agent, or Firm*—Foley & Lardner

[57] ABSTRACT

A line pressure control apparatus of an automatic transmission controls the line pressure of the automatic transmission under a lockup condition to ensure an engagement capacity and an amount of lubrication oil for an engaged friction element under a high vehicle speed condition. The line pressure control apparatus comprises a line pressure lowering section, a vehicle speed deciding section and a pressure changing section. The pressure lowering section lowers a line pressure under a lockup condition of the automatic transmission. The vehicle speed deciding section decides whether a vehicle speed of the automotive vehicle is higher than a predetermined value. The pressure changing section changes the line pressure under the lockup condition from the lowered line pressure to a line pressure under a normal condition when the vehicle speed is higher than the predetermined value.

7 Claims, 6 Drawing Sheets

FIG.6A NORMAL

FIG.6B 3RD SPEED LOCKUP

FIG.6C 4TH SPEED LOCKUP

LINE PRESSURE CONTROL APPARATUS OF AUTOMATIC TRANSMISSION

BACKGROUND OF THE INVENTION

The present invention relates to improvements in a line pressure control apparatus of an automatic transmission which apparatus controls a line pressure of the automatic transmission under a lockup condition so as to ensure an engagement capacity and an amount of lubrication oil for an engaged friction element under a high vehicle speed condition.

Japanese Patent Provisional Publication No. 2-309056 discloses a conventional line pressure control apparatus of an automatic transmission which apparatus is arranged to lower the line pressure when an engagement of a lockup clutch of a torque converter is established. More particularly, during the time period from the output of the lockup engagement command to the time elapsed the predetermined time period, the line pressure is gradually lowered according to an input torque of the automatic transmission. Further, when the lockup engagement is accomplished, the line pressure is set at a value lower than that of the normal condition. In this conventional line pressure control apparatus, the balance between the supply and consumption of lubrication oil at the automatic transmission under the lockup condition is controlled by decreasing the leak amount of lubrication oil for the automatic transmission. The decrease of the leak amount is executed by setting the lockup line pressure at a lower value as compared with that of the normal condition.

In contrast, the necessary amount of the lubrication oil in the automatic transmission is generally determined according to the input torque to the engaged friction element such as the engine torque and the rotation speed of the engaged friction element such as the vehicle speed. However, the conventional line pressure control apparatus is arranged to determine the amount of the lubrication oil for the automatic transmission only by the engine torque. This may cause a shortage of the lubrication oil when the vehicle travels in a high vehicle speed.

SUMMARY OF THE INVENTION

It is an object of the present invention to provide an improved line pressure control apparatus which controls a line pressure of an automatic transmission under a lockup condition so as not to generate the shortage of the lubrication oil for the automatic transmission even when a vehicle equipped with this automatic transmission travels in a high vehicle speed.

A line pressure control apparatus of an automatic transmission according to the present invention is for an automotive vehicle. The line pressure control apparatus controls the line pressure of the automatic transmission under a lockup condition. The line pressure control apparatus comprises a lowering block, a deciding block and a changing block. The lowering block is arranged to lower a line pressure under a lockup condition of the automatic transmission. The deciding block is arranged to decide whether a vehicle speed of the automotive vehicle is higher than a predetermined value. The changing block is arranged to change the line pressure under the lockup condition from the lowered line pressure to a line pressure under a normal condition when the deciding block decides that the vehicle speed is higher than the predetermined value.

DETAILED DESCRIPTION OF THE INVENTION

Referring to FIGS. 1 to 6C, there is shown an embodiment of a line control apparatus of an automatic transmission 3 according to the present invention.

Figure 1:
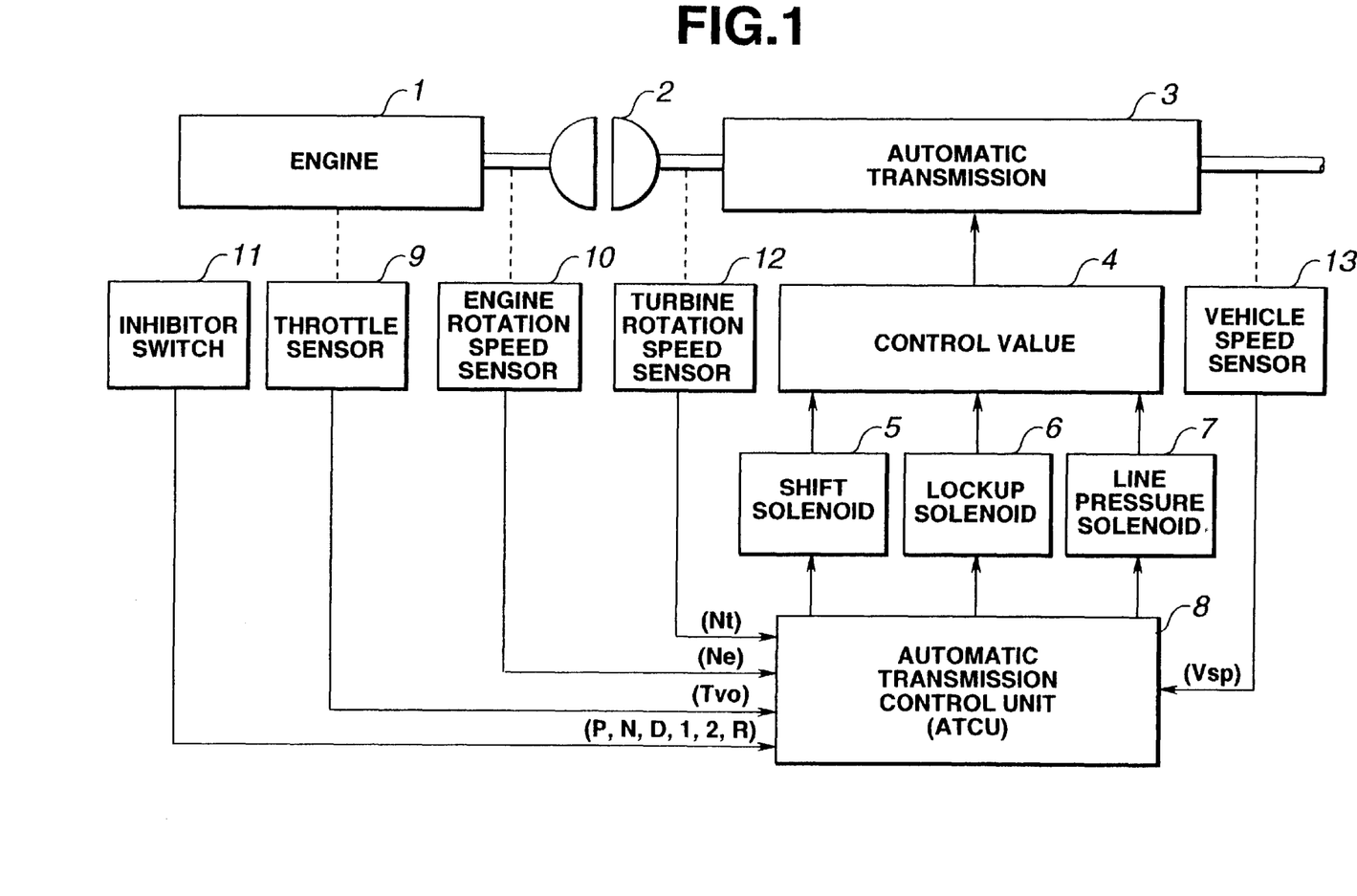
FIG. 1 is a block diagram which shows a line pressure control apparatus of an automatic transmission of an embodiment according to the present invention.

This automatic transmission 3 for an automotive vehicle is of a fourth speed type which is arranged to selectively take first, second, third and fourth speeds when D-range is selected. When the automatic transmission 3 is set in a normal condition such as an over-drive (OD) operating condition, the lockup engagement of a torque converter 2 is executed at the fourth speed. When the automatic transmission 3 is set in an OD released condition, the lockup engagement of the torque converter 2 is executed at the third speed. The line pressure control apparatus comprises an engine 1, the automatic transmission 3, an automatic transmission control unit (ATCU) 8 and sensors 9, 10, 11, 12 and 13. The automatic transmission 3 is connected to an engine output shaft of the engine 1 through the torque converter 2. The ATCU 8 is arranged to execute a shift control for hydraulically and selectively operating friction elements communicated with a control valve 4 by ON/OFF controlling a solenoid valve 5, a lockup solenoid 6 and a line pressure solenoid 7.

The sensors for the line pressure control apparatus is a throttle sensor 9 for detecting an throttle opening degree Tvo of the engine 1, an engine rotation speed sensor 9 for detecting an engine rotation speed Ne, an inhibitor switch 11 which outputs a signal indicative of select range (P, N, D, 1, 2, R) of a manual valve of the automatic transmission 3, a turbine rotation speed sensor 12 which detects an output rotation speed (turbine rotation speed) Nt of the torque converter 2, and a vehicle speed sensor 13 for detecting a vehicle speed Vsp.

The ATCU 8 receives the signals from the throttle sensor 9, the engine rotation speed sensor 10, the inhibitor switch 11, the turbine rotation speed sensor 12 and the vehicle speed sensor 13, and executes the line pressure control including a lockup line pressure control which is a line pressure control under a lockup condition of the torque converter 2.

Figure 2:
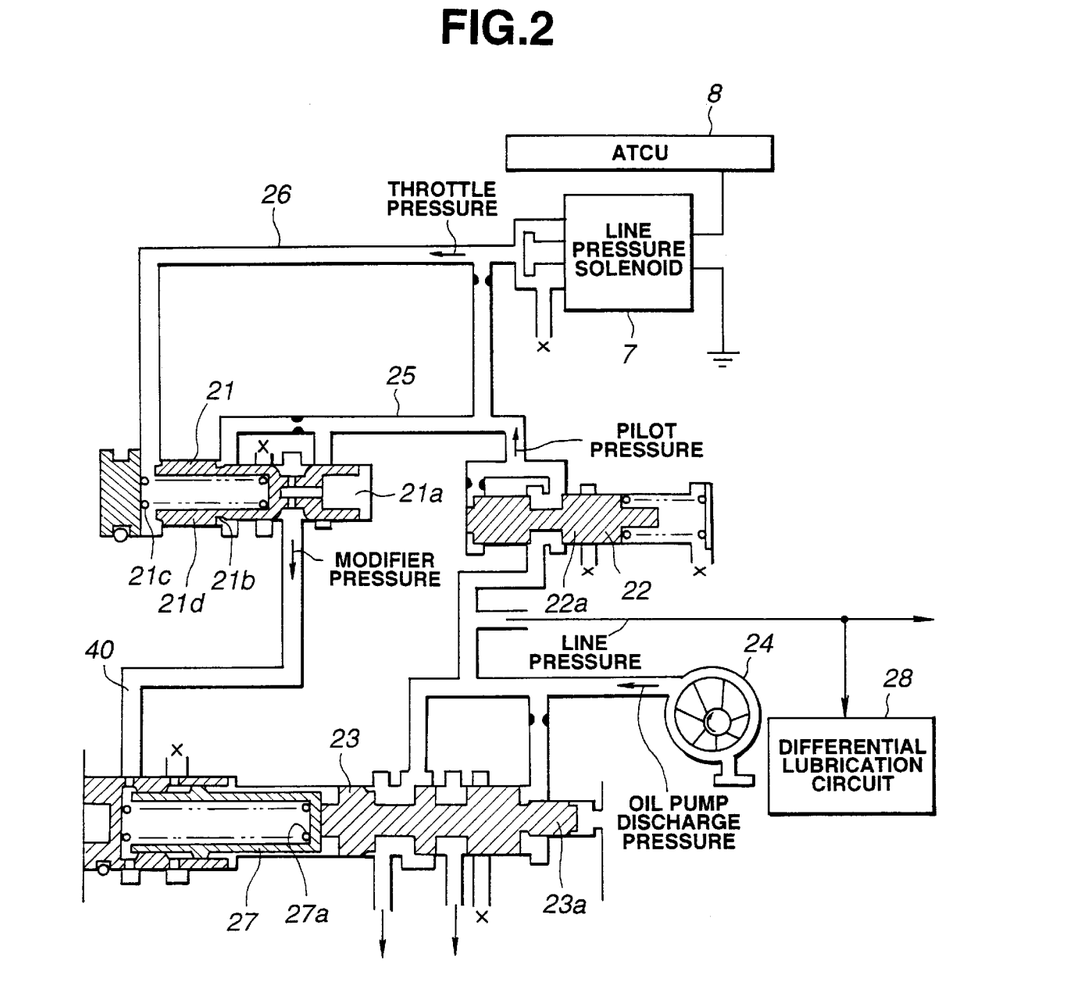
FIG. 2 is a hydraulic circuit diagram which shows a line pressure control system of the embodiment of FIG. 1.

As shown in FIG. 2, the line pressure control is mainly executed by means of a pressure modifier valve 21. The pressure modifier valve 21 receives a throttle pressure controlled by the ATCU 8 through the ON/OFF control of the line pressure solenoid 7 as an input signal and controls a pilot pressure outputted from the pilot valve 22 at a signal pressure to be applied to the pressure regulator valve 23. The pressure regulator valve 23 is controlled by this signal pressure so as to adjust the oil pump discharge pressure discharged from an oil pump 24 at a line pressure.

The pressure modifier valve 21 is connected with a pilot pressure passage 25 and the throttle pressure passage 26. The pilot pressure is applied from the pilot valve 22 through the pilot pressure passage 25 to an oil chamber 21a and a difference pressure receiving area 21b of the pressure modifier valve 21. The pilot pressure is controlled at a pressure corresponding to the sum of the spring force of a spring 21c and the throttle pressure. A modifier pressure controlled at the modifier valve 21 is applied to the pressure regulator valve 23 through a passage 40 so as to push a spool 23a of the pressure regulator valve 23 toward the right hand side of FIG. 2 in conjunction with a spring 27a. By this balance control of the pressure regulator valve 23, the line pressure control is executed. The controlled line pressure is supplied to a differential lubrication circuit 28 and is used in a lubrication control.

Figure 3:
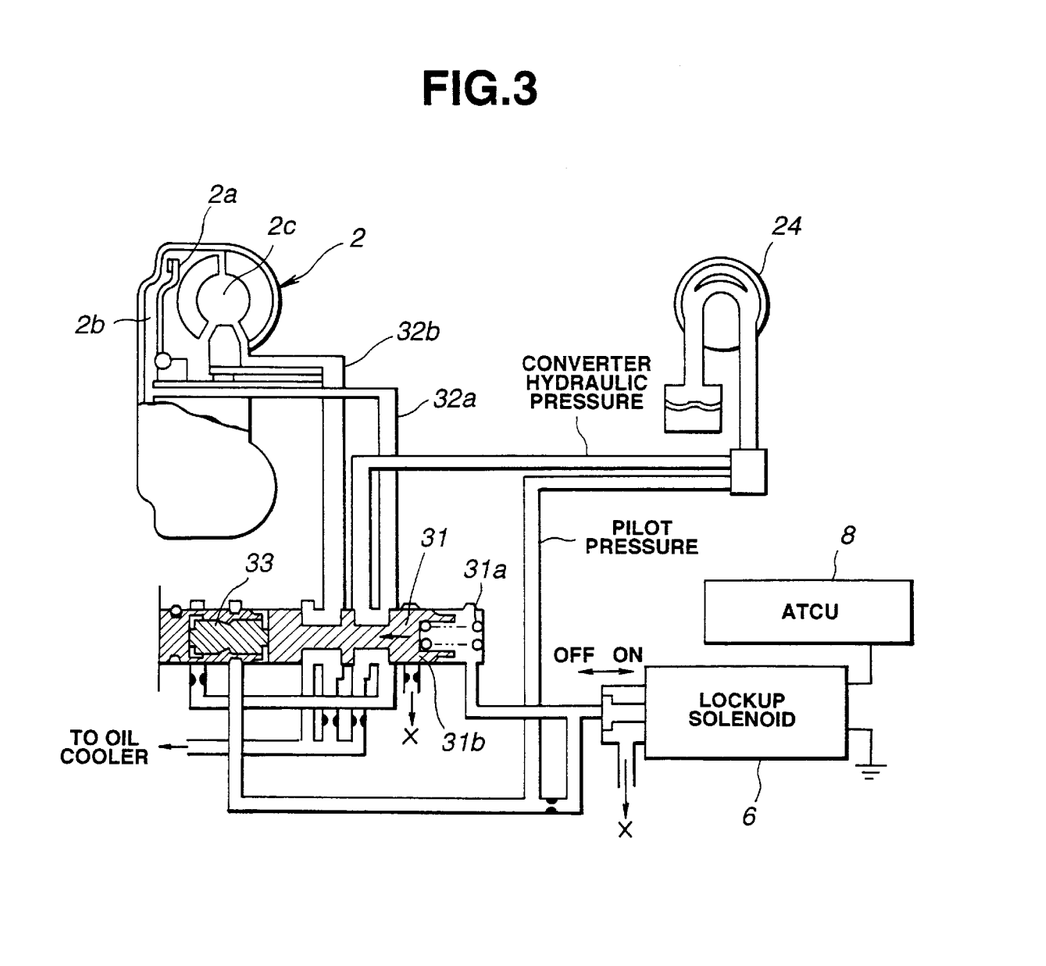
FIG. 3 is a hydraulic circuit diagram which shows a line pressure control system of the first embodiment of FIG. 1.

FIG. 3 shows a hydraulic circuit diagram of a lockup control system of the embodiment according to the present invention. A lockup control of the torque converter 2 is executed by the control of a lockup control valve 31. The lockup control valve 31 is arranged to switch a valve position thereof according to ON/OFF control of the lockup solenoid 6 controlled by the ATCU 8. More particularly, the engagement and disengagement of a lockup piston 2a of the torque converter 2 is executed by switching a working hydraulic pressure passage for supplying the working hydraulic pressure to the torque converter 2 between first and second converter hydraulic passages 32a and 32b.

When the ratio of the OFF time of the lockup solenoid 6 is set large (long) and the pilot pressure to be supplied to the lockup control valve 31 is not lowered, the lockup control system of this embodiment is put in a lockup disengaged condition as shown in FIG. 3. Therefore, the pilot pressure controlled by the lockup solenoid 6 is applied at a right end portion of a spool 31b of the lockup control valve 31 as shown in FIG. 3. The pilot pressure functions to push the spool 31b toward a lockup control plug 33. The converter hydraulic pressure is applied to a hydraulic chamber 2b of the torque converter 2 through the first converter hydraulic passage 32a and is supplied to a hydraulic chamber 2c from the hydraulic chamber 2b. Therefore, the lockup piston 2a of the torque converter 2 is disengaged. On the other hand, when the ratio of the ON time of the lockup solenoid 6 is set large (long) and the pilot pressure to be supplied to the lockup control valve 31 is lowered, the lockup control system of this embodiment is put in a lockup engaged condition.

Figure 4:
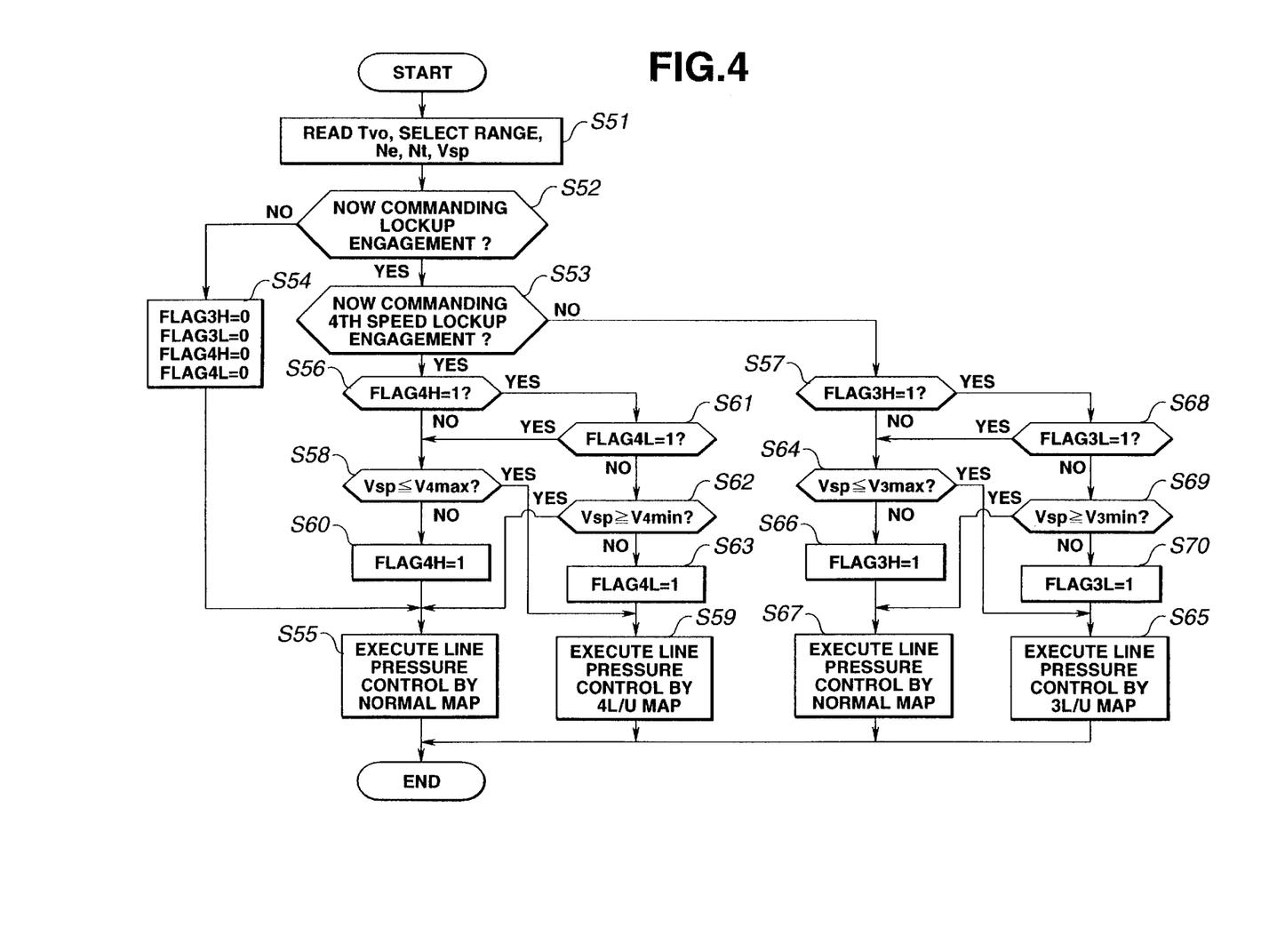
FIG. 4 is a flowchart which shows a control program of the line pressure control of the automatic transmission of the first embodiment.

FIG. 4 shows a control program for controlling the line pressure of the automatic transmission in the lockup condition. This control program is repeatedly executed at predetermined intervals.

At a step S51, the ATCU 8 reads the throttle opening degree Tvo, the engine rotation speed Ne, the signal indicative of the select range (P, N, D, 1, 2, R) of the manual valve, the turbine rotation speed Nt and the vehicle speed Vsp respectively from the throttle sensor 9, the engine rotation speed sensor 10, the inhibitor switch 11, the turbine rotation speed sensor 12 and the vehicle speed sensor 13.

At a step S52, the ATCU 8 decides as to whether a lockup ON command for locking up the torque converter 2 is now commanded or a lockup OFF command for disengaging the lockup piston 2a is commanded. When it is decided at the step S52 that the lockup ON command is now commanded, the routine of this control program proceeds to a step S53. When the lockup OFF command is commanded, the routine proceeds to a step S54. This decision as to the lockup ON command at the step S52 is executed by using a lockup map shown in FIG. 5 upon referring to the vehicle speed Vsp and the throttle opening degree Tvo.

Figure 5:
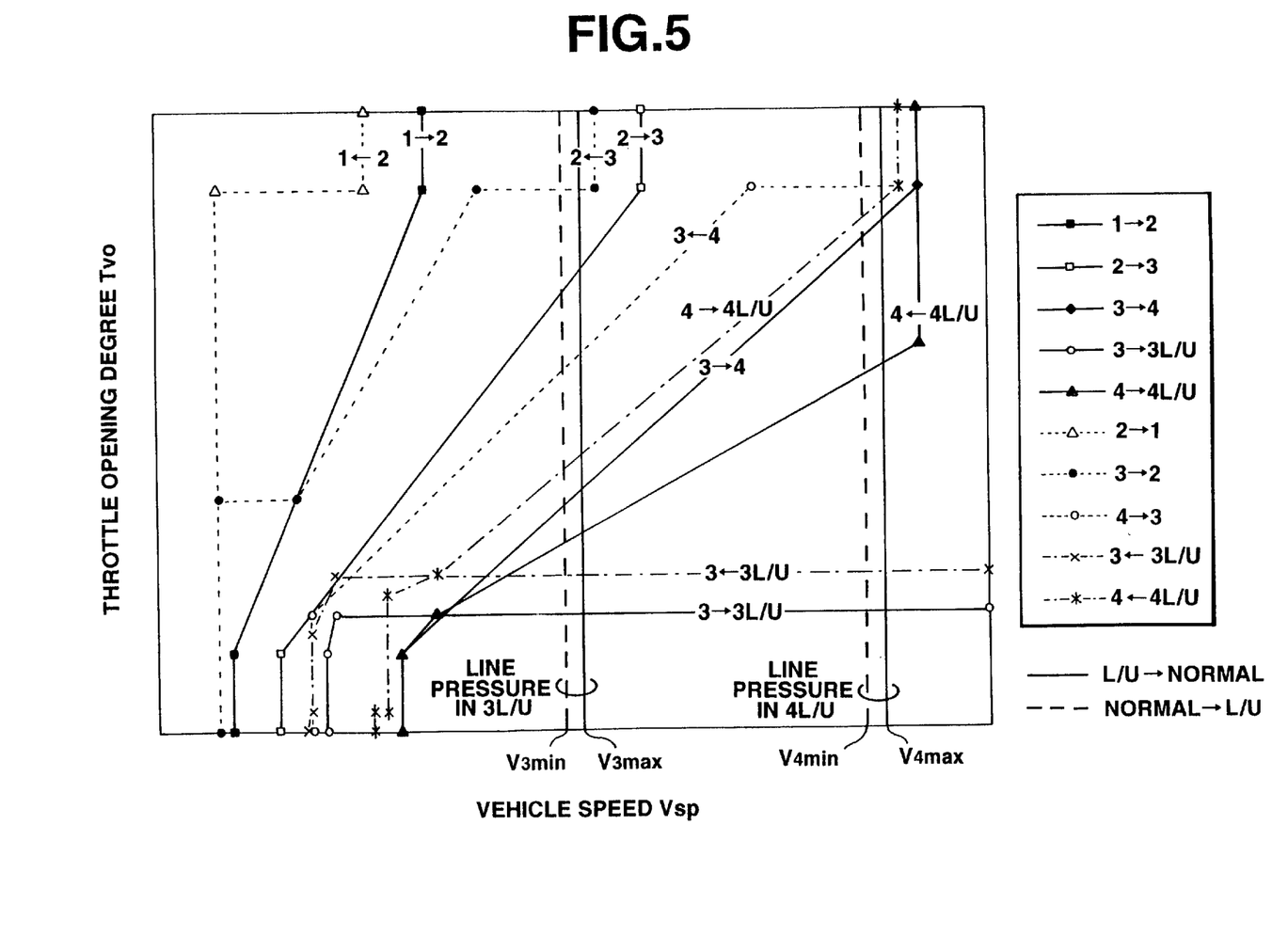
FIG. 5 is a graph which shows a lockup diagram including a shift change line, a line pressure curve, a lockup line pressure limited vehicle speed, and a normal line pressure limited vehicle speed.

The lockup map of FIG. 5 includes lockup engagement lines, lockup disengagement lines, up-shift shifting lines, down-shift shifting lines, a third speed line pressure zone, and a fourth speed line pressure zone. The lockup engagement lines includes a 3→3L/U (third speed lockup engagement) line and a 4→4L/U (fourth speed lockup engagement) line which are denoted by a continuous line. The lockup disengagement lines includes a 3←3L/U (third speed lockup disengagement) line and a 4←4L/U (fourth speed lockup disengagement) line which are denoted by a dot and dash line. The up-shift lines includes a 1→2 up-shifting line, a 2→3 up-shifting line, a 3→4 up-shifting line which are denoted by a continuous line. The down-shift lines include a 1←2 down-shifting line, a 2←3 down-shifting line, a 3←4 down-shifting line which are denoted by a dotted line. The third speed line pressure zone is denoted by a continuous line corresponding to a line pressure limit vehicle speed V3max under the third speed lockup condition and a dotted line corresponding to a line pressure limit vehicle speed V3min under a third speed normal condition. The fourth speed line pressure line is denoted by a continuous line corresponding to a line pressure limit vehicle speed V4max under the fourth speed lockup condition and a dotted line corresponding to a line pressure limit vehicle speed V4min under a fourth speed normal condition.

As is clear from the map of FIG. 5, a predetermined hysteresis is preset between the lockup engagement line and the lockup disengagement line, and another hysteresis is preset between the line pressure limit vehicle speed under the lockup condition and the line pressure limit vehicle speed under the normal condition. As shown in FIG. 5, the area of the third speed lockup (3L/U) and the area of the fourth speed lockup (4L/U) are partially overlapped in order to enable the fourth speed lockup during the over-drive (OD) operation and to enable the third speed lockup during the OD released time.

In the map of FIG. 5, when the vehicle condition represented by the throttle opening degree Tvo and the vehicle speed Vsp crosses the 4→4L/U line during the normal condition (OD operating condition), the ATCU 8 decides that the fourth speed lockup ON command is now commanded. When the vehicle condition represented by the throttle opening degree Tvo and the vehicle speed Vsp crosses the 4←4L/U line during the normal condition (OD operating condition), the ATCU 8 decides that the fourth speed lockup OFF command is now commanded. When the vehicle condition represented by the throttle opening degree Tvo and the vehicle speed Vsp crosses the 3→3L/U line during the OD released condition, the ATCU 8 decides that the third speed lockup ON command is now commanded. When the vehicle condition represented by the throttle opening opening degree Tvo and the vehicle speed Vsp crosses the 3←3L/U line during the OD released condition, the ATCU 8 decides that the third speed lockup OFF command is now commanded.

At the step S53 following to YES decision of the step S52, the ATCU 8 decides as to whether the fourth speed lockup (4L/U) is now commanded or the third speed lockup (3L/U) is now commanded. When the ATCU 8 decides that the fourth speed lockup is now commanded, the routine proceeds to a step S56. When the ATCU 8 decides that the third speed lockup is now commanded, the routine proceeds to a step S57.

At the step S54 following to NO decision of the step S52, flags FLAG3H, FLAG3L, FLAG4H and FLAG4L are reset (FLAG3H=0, FLAG3L=0, FLAG4H=0, FLAG4L=0).

Figure 6A:
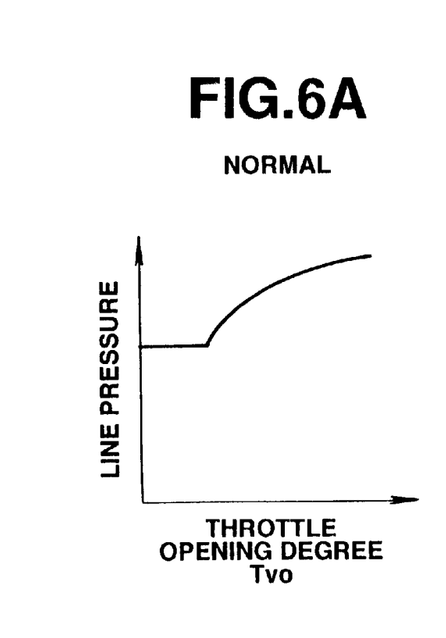
FIGS. 6A to 6C are a normal line pressure map, a third speed lockup line pressure and a fourth speed lockup line pressure.

At a step S55, the ATCU 8 executes the line pressure control by using the normal condition line pressure map such as shown in FIG. 6A.

At the step S56 following to YES decision of the step S53, the ATCU 8 checks as to whether the flag FLAG4H is set at 1 or not. This flag FLAG4H is set at O when the vehicle speed Vsp is smaller than or equal to the line pressure limit vehicle speed V4max under the fourth speed lockup condition. Further, the flag FLAG4H is set at 1 (FLAG4H=1) when the vehicle speed Vsp becomes greater than the line pressure limit vehicle speed V4max under the fourth speed lockup condition. When the ATCU 8 decides that the fourth speed lockup ON command is now commanded after the flag FLAG4H is set at 0 at the step S54, the decision at the step S56 becomes NO and the routine proceeds to a step S58.

At the step S58, the ATCU 8 decides as to whether the vehicle speed Vsp is smaller than or equal to the line pressure limit vehicle speed V4max under the fourth speed lockup condition. When Vsp≦V4max, the routine proceeds to a step S59 wherein the line pressure control is executed by using the line pressure map under the fourth speed lockup such as the map shown in FIG. 6C, so as to decrease the line pressure at a value smaller than that of the normal condition. When Vsp>V4max, the routine proceeds to a step S60 wherein the flag FLAG4H is set at 1 (FLAG4H=1). Then, the routine proceeds to a step S55 wherein the normal line pressure control is executed so as to set the line pressure at a value higher than that under the normal condition.

Figure 6B:
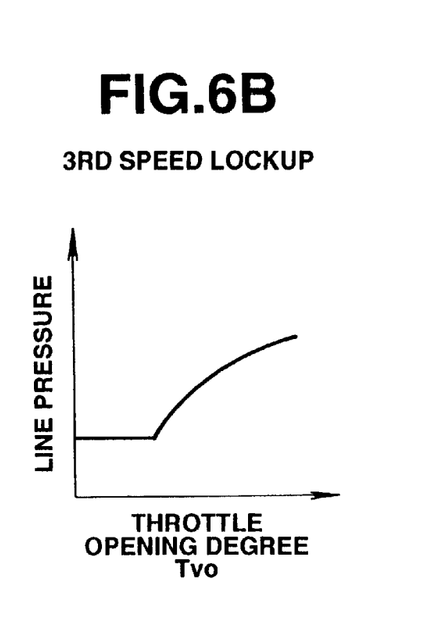
Figure 6C:
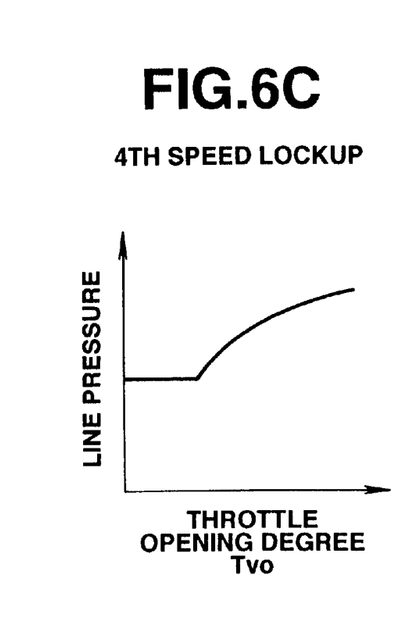

The line pressure map under the fourth speed lockup shown in FIG. 6C and the line pressure map under the third speed lockup shown in FIG. 6B are respectively set so as to ensure the safety ratio of the engagement capacity of each engaged friction element in case that the torque converter condition is put on the lockup OFF line. The reason for setting the line pressure as mentioned above is that each engaged friction element is required to have a larger engagement capacity to be able to perform non-slipping in the torque converter condition in case that the throttle is opened at an opening degree adjacent to the lockup OFF line just after the condition of the automatic transmission is set from the torque converter condition to the lockup ON area. By this lockup line pressure map, it becomes possible to set the line pressure so as to ensure the sufficient engagement capacity of each engaged friction element under the third speed lockup and the fourth speed lockup. In this case, since the line pressure is set at a hydraulic pressure which is lowered as compared with the normal line pressure so as to ensure the capacity safety ratio of each engaged friction element under the lockup condition. Therefore, under the lockup condition, the ATF leak amount of the hydraulic oil is decreased so as to balance the incoming and outgoing of the hydraulic oil.

Just after the execution of the step S60, the decision at the step S56 becomes YES and therefore the routine proceeds to a step S61.

At the step S61 the ATCU 8 checks as to whether the flag FLAG4L is set at 1 or not. This flag FLAG4L takes 0 when the vehicle speed Vsp is greater than or equal to the limit vehicle speed V4min under the fourth speed normal line pressure. When the vehicle speed Vsp is smaller than the limit vehicle speed V4min, the flag FLAG4L takes 1. Therefore, just after the execution of the step S60, the decision at the step S61 becomes NO, and the routine proceeds to a step S62.

At the step S62, the ATCU 8 decides as to whether the vehicle speed Vsp is greater than or equal to the limit vehicle speed V4min under the fourth speed normal line pressure or not. When Vsp≧V4min, the routine proceeds to the step S55 wherein the line pressure control is executed by using the normal line pressure map so as to keep the line pressure at a high value in the normal condition. When Vsp<V4min, the routine proceeds to a step S63 wherein the flag FLAG4L is set at 1 (FLAG4L=1). Then, the routine proceeds to the step S59 wherein the line pressure control is executed by using the fourth speed lockup line pressure map so as to set the line pressure at a value lower than that under the normal condition.

At the NO decision of the step S58 and the YES decision of the step S62, the ATCU 8 functions as a high vehicle speed deciding means.

At the step S57 following to the NO decision of the step S53, the ATCU 8 checks as to whether the flag FLAG3H takes 1 or not. This flag FLAG3H takes 0 when the vehicle speed Vsp is smaller than or equal to the limit vehicle speed V3max under the third speed lockup line pressure. When greater than the limit vehicle speed V3max, the flag FLAG3H takes 1. Since the flag FLAG3H is set at 1 (FLAG3H=1) at the step S54 just after the NO decision of the step S53, the decision at the step S57 becomes NO and therefore the routine proceeds to a step S64.

At the step S64, the ATCU 8 decides as to whether the vehicle speed Vsp is smaller than or equal to the limit speed V3max or not. When Vsp≦V3max, the routine proceeds to a step S65 wherein the line pressure control is executed by using the third speed lockup line pressure map such as the map shown in FIG. 6B so as to lower the line pressure at the value lower than that of the normal condition. When the Vsp>V3max, the routine proceeds to a step S66 wherein the flag FLAG3H is set at 1 (FLAG3H=1). Then, the routine proceeds to a step S67 wherein the line pressure control is executed by using the normal line pressure map so as to control the line pressure at a normal high value.

Just after the execution of the step S66, the decision at the step S57 becomes YES and therefore the routine proceeds to a step S68.

At the step S68, the ATCU 8 checks as to whether the flag FLAG3L is set at 1 or not. This flag FLAG3L takes 0 when the vehicle speed Vsp is greater than or equal to the limit vehicle speed V3min under the third speed normal line pressure. When smaller than the limit vehicle speed V3min, the flag FLAG3L takes 1. Therefore, just after the execution of the step S66 the decision at the step S68 becomes NO, and the routine proceeds to a step S69.

At the step S69, the ATCU 8 decides as to whether the vehicle speed Vsp is greater than or equal to the limit vehicle speed V3min under the third speed normal line pressure or not. When Vsp≧V3min, the routine proceeds to the step S67 wherein the line pressure control is executed by using the normal line pressure map so as to keep the line pressure at the normal high value. When Vsp<V3min, the routine proceeds to the step S65 wherein the line pressure control is executed by using the third speed lockup line pressure map so as to lower the line pressure at the value lower than that of the normal condition.

At the NO decision of the step S64 and the YES decision of the step S69, the ATCU 8 functions as the high vehicle speed deciding means.

Next, the manner of operation of the line pressure control apparatus of the embodiment according to the present invention will be discussed by comparing with the conventional art.

When the normal line pressure control is executed, the ATCU 8 outputs a line pressure duty signal according to the throttle opening degree signal Tvo from the throttle sensor 9 by determining the line pressure duty signal from the previous stored map. By the output pressure of the line pressure solenoid 7 controlled on the basis of the line pressure duty ratio and the functions of the pressure modifier valve 21 and the pressure regulator valve 23, the line pressure for engaging each friction element is controlled. Part of the line pressure is supplied to the differential lubrication circuit 28. Therefore, the line pressure is required to perform the hydraulic pressure which is sufficient to engage each friction element and to supply the necessary amount of the hydraulic oil to the differential lubrication circuit 28. The necessary amount of the hydraulic oil is determined according to the input torque of the friction element and the input rotation speed.

On the other hand, in the conventional art disclosed in the Japanese Patent Provisional Publication No. 2-309056, the lockup line pressure is determined only by the input torque (the torque converter torque ratio) of the automatic transmission. Therefore, in case that the rotation speed of the input shaft of the automatic transmission becomes high, the input torque of the automatic transmission is decreasingly changed, and the friction element, which receives lubrication oil from the line pressure, is rotated in high speed of each shift position executing the lockup. Accordingly, the amount of the lubrication oil supplied to the friction element becomes short. Therefore, in case that the line pressure determined by the input torque of the automatic transmission is smaller than a value at which it is difficult to supply the amount of the lubrication oil determined by the input shaft rotation speed, it is necessary to determine the line pressure by the input shaft rotation speed in order to ensure the necessary amount of the lubrication oil. However, since the conventional automatic transmission is arranged to equivalently decrease the line pressure according to the lockup command regardless the vehicle speed, it is difficult to ensure the necessary amount of the lubrication oil under the high vehicle speed condition.

Taking account of the conventional problem, the present embodiment according to the present invention is arranged to switch the line pressure from the lockup line pressure to the normal line pressure, in case of the high rotation speed of the input shaft.

That is to say, the ATCU 8 has previously set the normal line pressure map therein, the lockup line pressure map by each lockup shift position such as the third speed and the fourth speed of D-range, the up-shift and down-shift lines and the upper and lower limit speeds of each lockup shift position. Further, the ATCU 8 has previously set the ranges (areas) for deciding the lockup ON command (and the lockup OFF command) and the lockup line pressure (and the normal line pressure). Accordingly, in case that the lockup ON command is now commanded and the condition represented by the vehicle speed Vsp and the throttle opening degree Tvo is put in a zone surrounded by the 3→3L/U line and the limit vehicle speed V3max under the third speed lockup line pressure, the line pressure is changed from the normal line pressure to the third speed lockup line pressure. Further, in case that the condition represented by the vehicle speed Vsp and the throttle opening degree Tvo is out of the above mentioned zone by the further increase of the vehicle speed Vsp, the line pressure is changed from the lockup line pressure to the normal line pressure in order to ensure the necessary amount of the lubrication oil required in the high vehicle speed condition.

With the thus arranged line pressure control, the line pressure is controlled so as to simultaneously ensure the engagement capacity necessary for the engaged friction element in the third speed lockup and in the fourth speed lockup and the amount of the lubrication oil necessary for the friction element. Further, since the line pressure is determined according to the decision of the above-mentioned zone, the load applied to the ATCU 8 is largely decreased as compared with the conventional system such as the Japanese Patent Provisional Publication No. 2-309056 wherein the line pressure is determined according to the plural parameters such as the throttle opening degree.

It will be understood that the present invention is not limited to the embodiment mentioned above and that various changes and deformations may be applied to thereto without departing from the sprit of the present invention. For example, although the embodiment according to the present invention has been shown and described such that the automatic transmission executes the lockup at the fourth speed and the third speed in the D-range, it will be understood that the invention may be applied to an automatic transmission which executes the lockup of the highest shift speed or to an automatic transmission which has a different number of shift positions and a different number of shift positions of the lockup control.

Although the embodiment according to the present invention has been shown and described such that one of the lockup line pressure maps of FIGS. 6B and 6C is selected by the condition that (limit vehicle speed V3max under the third speed lockup line pressure)<(limit vehicle speed V4max under the fourth speed lockup line pressure), it will be understood that this relationship may be changed according to the construction of an applied automatic transmission.

Furthermore, taking account of the conditions that the line pressure under the normal condition is properly set in all applied ranges of the shift speeds, shift positions, the vehicle speed and the throttle opening degree and that the line pressure under each shift speed lockup condition is determined from a predetermined zone according to the capacity of each engaged friction element, the limit vehicle speed V3min, V3max, V4min, V4max may be determined from a map according to the vehicle speed and the throttle opening degree.

What is claimed is:

1. A line pressure control apparatus of an automatic transmission for an automotive vehicle comprising:

means for lowering a line pressure under a lockup condition of the automatic transmission;

means for deciding whether the vehicle speed of the automotive vehicle is higher than a predetermined value; and means for changing the line pressure under the lockup condition from the lowered line pressure to a line pressure under a normal condition when said deciding means decides that the vehicle speed is higher that the predetermined value.

2. A line pressure control apparatus as claimed in claim 1, wherein the automatic transmission has a plurality of shift positions each of which is put in a lockup condition, a plurality of lockup line pressures being provided in corresponding to the plurality of shift positions, respectively.

3. A line pressure control apparatus as claimed in claim 2, wherein said deciding means has a plurality of predetermined values corresponding to the plurality of shift positions, the plurality of predetermined values being set so as to become smaller according to the lowering of the shift positions.

4. A method for controlling line pressure of an automatic transmission for an automotive vehicle, the method comprising the steps of:

lowering a line pressure under a lockup condition of the automatic transmission;

deciding whether a vehicle speed of the automotive vehicle is higher than a predetermined value; and changing the line pressure under the lockup condition from the lowered line pressure to a line pressure under a normal condition when the vehicle speed is higher than the predetermined value.

5. A line pressure control apparatus of an automatic transmission for an automotive vehicle comprising:

a first sensor unit detecting an operating condition of an engine of the automotive vehicle;

a second sensor unit detecting an operating condition of the automatic transmission including a torque converter;

a control valve selectively establishing shift speed;

a line pressure solenoid repeatedly ON-OFF controlled so as to control a line pressure of the automatic transmission; and a control unit arranged to read the signals from said first and second sensor units, to decide whether the torque converter is put in a lockup condition, to lower the line pressure when it is decided that the torque convert is put in the lockup condition, to decide whether the vehicle speed of the automotive vehicle is higher than a predetermined value, and to change the line pressure under the lockup condition from the lowered line pressure to a line pressure under a normal condition when it is decided that the vehicle speed is higher than the predetermined value.

6. A line pressure control apparatus as claimed in claim 5, wherein said first sensor unit includes a throttle sensor and an engine rotation speed sensor, and said second sensor unit includes a turbine rotation speed sensor, a vehicle speed sensor and an inhibitor switch.

7. A line pressure control apparatus as claimed in claim 5 wherein said control valve includes a pressure modifier valve through which a line pressure control is executed by the control unit.

* * * * *